US012792816B2

(12) United States Patent
Liao et al.

(10) Patent No.: US 12,792,816 B2
(45) Date of Patent: Nov. 10, 2026

(54) SYSTEM FOR PHYSICAL VERIFICATION RUNTIME REDUCTION AND METHOD OF USING SAME

(71) Applicants: TAIWAN SEMICONDUCTOR MANUFACTURING COMPANY, LTD., Hsinchu (TW); TSMC NANJING COMPANY, LIMITED, Nanjing (CN)

(72) Inventors: Chia-Chun Liao, Hsinchu (TW); Shuang Dai, Hsinchu (TW); Yawen Chen, Hsinchu (TW); Meng-Hsuan Wu, Hsinchu (TW)

(73) Assignees: TAIWAN SEMICONDUCTOR MANUFACTURING COMPANY, LTD., Hsinchu (TW); TSMC NANJING COMPANY, LIMITED, Nanjing (CN)

( * ) Notice: Subject to any disclaimer, the term of this patent is extended or adjusted under 35 U.S.C. 154(b) by 690 days.

(21) Appl. No.: 18/320,421

(22) Filed: May 19, 2023

(65) Prior Publication Data

US 2024/0346225 A1 Oct. 17, 2024

(30) Foreign Application Priority Data

Apr. 13, 2023 (CN) ........................ 202310394537.X

(51) Int. Cl.

| | |
|---|---|
| ***G06F 30/398*** | (2020.01) |
| *G06F 119/02* | (2020.01) |

(52) U.S. Cl.
CPC ........ *G06F 30/398* (2020.01); *G06F 2119/02* (2020.01)

(58) Field of Classification Search
CPC .. G06F 30/398; G06F 2119/02; G06F 18/231; G06F 18/23213; G06F 30/27
See application file for complete search history.

(56) References Cited

U.S. PATENT DOCUMENTS

| | | | | |
|---|---|---|---|---|
| 7,409,656 | B1 * | 8/2008 | Ruehl | G06F 8/45 716/112 |
| 7,913,206 | B1 * | 3/2011 | Cadouri | G06F 30/398 716/112 |
| 8,099,693 | B2 * | 1/2012 | Pedenon | G06F 30/30 716/101 |
| 10,303,833 | B1 * | 5/2019 | Gayasen | G06F 30/398 |
| 10,706,208 | B1 * | 7/2020 | Li | G06F 30/398 |
| 10,755,026 | B1 * | 8/2020 | Luo | G06F 30/398 |

(Continued)

*Primary Examiner* — Nha T Nguyen
(74) *Attorney, Agent, or Firm* — Hauptman Ham, LLP

(57) ABSTRACT

A method of performing a design rule check includes clustering at least one of a plurality of rules with overlapping operations from a plurality of operations or the plurality of operations with overlapping rules from the plurality of rules. The method further includes at least one of transforming at least one of the clustered plurality of operations into a first operation group or a second operation group, or transforming at least one of the clustered plurality of rules into a first rule group or a second rule group. The method even further includes at least one of assigning at least one of the first operation group to a first processor or the second operation group to a second processor, or assigning at least one of the first rule group to the first processor or the second rule group to the second processor.

20 Claims, 8 Drawing Sheets

(56) References Cited

U.S. PATENT DOCUMENTS

| | | | | |
|---|---|---|---|---|
| 11,972,193 | B1 * | 4/2024 | Grossmann | G06F 30/27 |
| 2006/0265675 | A1 * | 11/2006 | Wang | G06F 30/398<br>716/112 |
| 2008/0077891 | A1 * | 3/2008 | Dooling | G06F 30/398<br>716/52 |
| 2013/0159948 | A1 * | 6/2013 | Agarwal | G06F 30/398<br>716/112 |
| 2018/0121594 | A1 * | 5/2018 | Studders | G06F 30/398 |
| 2021/0110095 | A1 * | 4/2021 | Zhang | G06F 30/398 |
| 2021/0374319 | A1 * | 12/2021 | Gibson | G06F 9/4881 |
| 2022/0382955 | A1 * | 12/2022 | Wang | G06F 30/398 |
| 2023/0334216 | A1 * | 10/2023 | Grudanov | G06F 30/31 |
| 2023/0359804 | A1 * | 11/2023 | Oriordan | G06F 30/398 |
| 2024/0256755 | A1 * | 8/2024 | Jung | G06F 30/398 |

* cited by examiner

401

Custer result

| groups | rule name | runtime |
|---|---|---|
| group1 | rule 1,2 | A |
| group2 | rule 3 | B |
| group3 | rule 4,5,6 | C |
| group4 | rule 7,8,9 | D |
| group5 | rule 10,11,12,14 | E |
| group6 | rule 15,16 | F |
| group7 | rule 17,18,19 | G |
| total runtime | | T |

Available machines
Ex: 3

404

402

Parallel proposal

| proposal | groups |
|---|---|
| rul1 | group1 |
| | group2 |
| | group3 |
| rul2 | group4 |
| | group5 |
| rul3 | group6 |
| | group7 |

FIG. 4

SYSTEM FOR PHYSICAL VERIFICATION RUNTIME REDUCTION AND METHOD OF USING SAME

BACKGROUND

The integrated circuit (IC) industry produces a variety of analog and digital semiconductor devices to address issues in different areas. Developments in semiconductor process technology nodes have progressively reduced component sizes and tightened spacing resulting in progressively increased transistor density. ICs progressively become smaller.

Physical verification is a process whereby an IC layout design is verified via electronic design automation (EDA) software tools to ensure correct electrical and logical functionality and manufacturability. Verification involves a design rule check (DRC) that verifies that the IC layout meets technology-imposed constraints. DRC verifies layer density for chemical-mechanical polishing (CMP), layout versus schematic (LVS verifies the functionality of the IC layout design), XOR (exclusive OR), etc. DRC is done to confirm that desired modifications have been made and no undesired modifications have been made. In the use case of antenna checks, DRC determines whether interconnects, that are not electrically connected to silicon or grounded, exist during the processing steps of the IC layout. Moreover, the antenna checks can identify the unacceptable charge accumulation in isolated nodes of an integrated circuit. Verification also involves an electrical rule check (ERC) that verifies the correctness of power and ground connections, and that signal transition times (slew), capacitive loads and fanouts are appropriately bounded.

BRIEF DESCRIPTION OF THE DRAWINGS

One or more embodiments are illustrated by way of example, and not by limitation, in the figures of the accompanying drawings. The drawings are not to scale, unless otherwise disclosed.

FIG. 4 is a diagram of the assignment of groups for parallel processing, in accordance with some embodiments.

DETAILED DESCRIPTION

Figure 1:
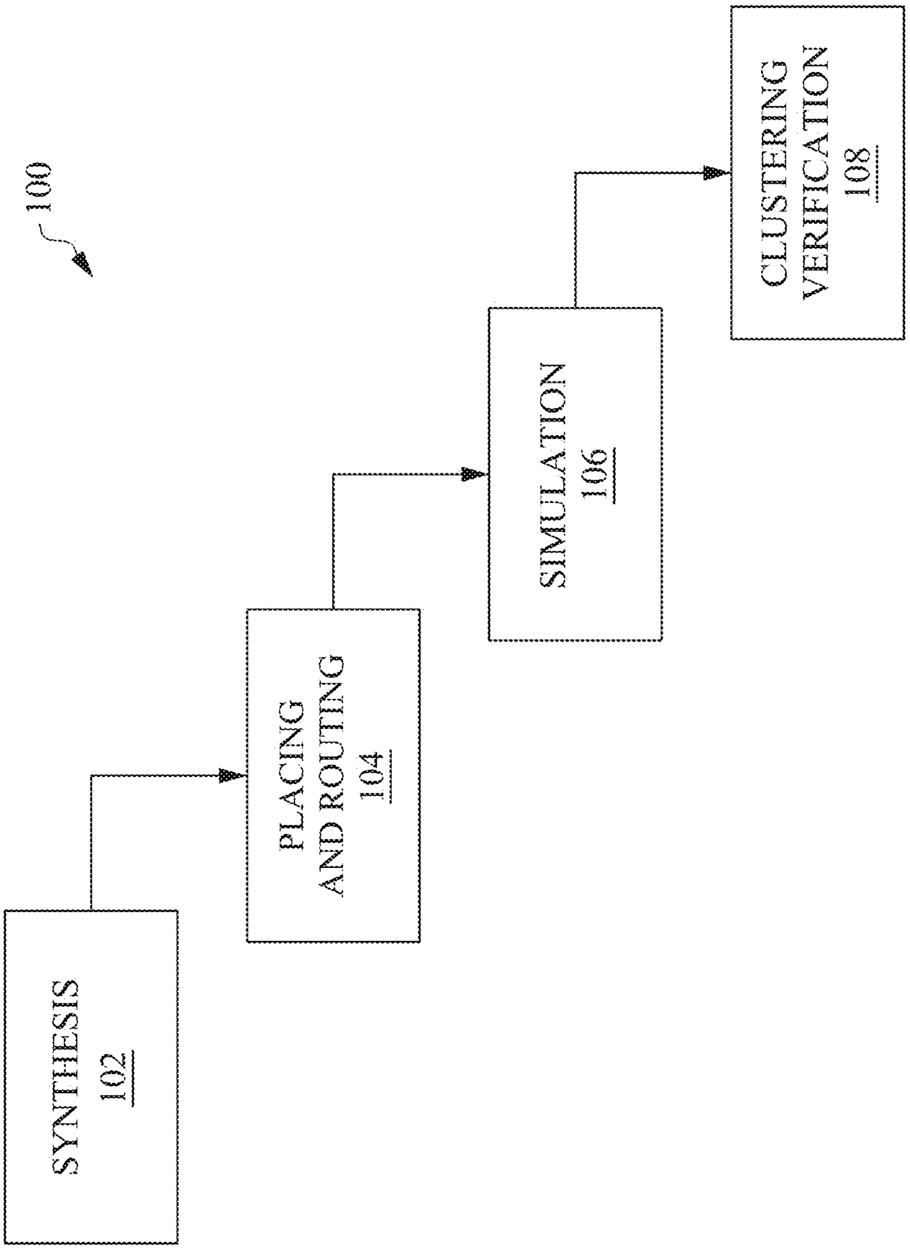
FIG. 1 is a block diagram of an electronic design automation (EDA) platform, in accordance with some embodiments.

The following discloses many different embodiments, or examples, for implementing different features of the subject matter. Examples of components, materials, values, steps, operations, arrangements, or the like, are described below to simplify the present embodiments. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are in indirect contact. In addition, the present disclosure repeats reference numerals and/or letters in the various examples. This repetition is for purposes of simplicity of illustration in the figures and reduced repetition of corresponding discussion in the embodiments; the scope of any relationship imputable from elements-in-common between the various embodiments and/or configurations discussed are informed by looking at contextual differences between common elements and distinct elements in different embodiments. For example, these contextual differences include differences resulting from the function of the distinct elements, differences of interconnection among otherwise-common elements, differences of timing relationships for otherwise-common elements, the resulting changes in interconnections and timing relationships in the otherwise-common elements because of the operation of the distinct elements, and/or the like.

Further, spatially relative terms, such as "beneath," "below," "lower," "above," "upper" or the like, are used herein for case of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein are likewise interpreted accordingly. In some embodiments, the term standard cell structure refers to a standardized building block included in a library of various standard cell structures. In some embodiments, various standard cell structures are selected from a library thereof and are used as components in a layout diagram representing a circuit.

FIG. 1 is a block diagram of an EDA system 100, in accordance with some embodiments.

In FIG. 1, EDA system 100 represents a design flow including one or more electronic design software applications, that when executed by one or more computing devices, processors (such as processors 602, 603, 604 of EDA system 100 shown in FIG. 6), controllers, or other devices that will be apparent to those skilled in the relevant art(s) without departing from the spirit and the scope of embodiments, design, simulate, analyze, and/or verify one or more high-level software level descriptions for an electronic architectural design, such as analog and/or digital circuitry for an IC.

In some embodiments, the one or more high-level software level descriptions are implemented using a high-level software language, such as a graphical design application, for example C. System C. C++, LabVIEW, and/or MATLAB, a general purpose system design language, such as SysML, SMDL and/or SSDL, or another suitable high-level software or general purpose system design language that is apparent to those skilled in the relevant art(s) without departing from the spirit and the scope of embodiments, or a high-level software format, such as Common Power Format (CPF), Unified Power Format (UPF), or any other suitable high-level software format that is apparent to those skilled in the relevant art(s) without departing from the spirit and the scope of the embodiments. In FIG. 1, the EDA system 100 includes a synthesis application 102, a placing and routing application 104, a simulation application 106, and a clustering verification application 108. In some embodiments, each application 102, 104, 106, or 108 is not performed in the order shown in FIG. 1 and instead are performed in any order unless specifically stated otherwise.

Embodiments are implemented in hardware, firmware, software, or any combination thereof. Embodiments further are implemented as instructions, such as computer program code 606 in FIG. 6, stored on a machine-readable medium, such as computer-readable storage medium 615 in FIG. 6, which is read and executed by one or more processors, such as processors 602, 603, 604 (FIG. 6) of EDA system 900. A machine-readable medium includes any mechanism for storing or transmitting information in a form readable by a machine (e.g., a computing device). For example, a machine-readable medium includes non-transitory machine-readable mediums such as read only memory (ROM); random access memory (RAM); magnetic disk storage media; optical storage media; flash memory devices; and other suitable machine-readable mediums within the scope of the embodiments. Further, firmware, software, routines, instructions are described herein as performing certain actions. However, such descriptions are for convenience and such actions result from computing devices, processors, controllers, or other devices executing the firmware, software, routines, instructions, or other suitable operations within the scope of the embodiments.

In some embodiments, the synthesis application 102, the placing and routing application 104, the simulation application 106, and the clustering verification application 108 represent one or more EDA software applications, which when executed by one or more systems, such as EDA system 100 in FIG. 1, computing devices, processors, controllers, or other devices that are apparent to those skilled in the relevant art(s) without departing from the spirit and the scope of the embodiments, configure the one or more computing devices, the processors, the controllers, or the other devices from being general purpose electronic devices into special purpose electronic devices to execute one or more of these applications as described in further detail below.

The synthesis application 102 translates one or more characteristics, parameters, or attributes of the IC into one or more logic operations, one or more arithmetic operations, one or more control operations, and/or any other suitable operation or operations that are apparent to those skilled in the relevant art(s) without departing from the spirit and the scope of the embodiments into the one or more high-level software level descriptions in terms of analog circuitry and/or digital circuitry of the IC. The synthesis application 102 utilizes a simulation algorithm to simulate the one or more logic operations, one or more arithmetic operations, one or more control operations, and/or other suitable operation or operations to verify the one or more logic operations, one or more arithmetic operations, one or more control operations, and/or the other suitable operation performed in accordance with one or more characteristics, parameters, or attributes of the IC as outlined in an electronic design specification.

The placing and routing application 104 translates the one or more high-level software descriptions to form an electronic architectural design for the analog circuitry and/or the digital circuitry of the IC. The placing and routing application 104 selectively chooses among one or more standard cells within libraries of standard cells, such as standard cell library 920 of EDA system 100 in FIG. 1, to translate the one or more logic operations, the one or more arithmetic operations, the one or more control operations, and/or the other suitable operation or operations of the one or more high-level software descriptions into geometric shapes and/or the interconnections between the geometric shapes to form the electronic architectural design for the analog circuitry and/or the digital circuitry of the IC. In some embodiments, at least one of the one or more standard cells includes one or more non-planar semiconductor devices, such as a finFET to provide an example. In some embodiments, various conductive structures such as, for example, source regions, gate regions, and/or drain regions of the one or more non-planar semiconductor devices are electrically connected to one or more metal rail conductors. In some embodiments, at least one of the one or more standard cells includes an antenna.

After selecting the one or more standard cells from the libraries of standard cells, the placing and routing application 104 places the one or more selected standard cells onto IC design real estate. Thereafter, the placing and routing application 104 routes various interconnections between the one or more selected standard cells in accordance with the one or more logic operations, the one or more arithmetic operations, the one or more control operations, and/or the other suitable operation or operations of the one or more high-level software descriptions to form the electronic architectural design for the analog circuitry and/or the digital circuitry of the IC. In some embodiments, the placing and routing application 104 electrically connects the one or more metal rail conductors between adjacent standard cells from among the one or more selected standard cells.

The simulation application 106 simulates the electronic architectural design for the analog circuitry and/or the digital circuitry of the IC to replicate one or more characteristics, parameters, or attributes of the electronic architectural design for the analog circuitry and/or the digital circuitry of the IC. In some embodiments, the simulation application 106 provides a static timing analysis (STA), a voltage drop analysis, also referred to as an infrared ray emission (IREM) analysis, a Clock Domain Crossing Verification (CDC check), a formal verification, also referred to as model checking, equivalence checking, or any other suitable analysis. In some embodiments, the simulation application 106 performs an alternating current (AC) analysis, such as a linear small-signal frequency domain analysis, and/or a direct current (DC) analysis, such as a nonlinear quiescent point calculation or a sequence of nonlinear operating points calculated while sweeping a voltage, a current, and/or a parameter to perform the STA, the IREM analysis, or the other suitable analysis.

The clustering verification application 108 verifies the one or more characteristics, parameters, or attributes of the electronic architectural design for the analog circuitry and/or the digital circuitry of the IC as replicated by the simulation application 106 to satisfy the electronic design specification. The clustering verification application 108 further performs a physical verification, also referred to as a DRC, to check whether the electronic architectural design for the analog circuitry and/or the digital circuitry of the IC satisfies one or more recommended parameters, referred to as design rules, as defined by a semiconductor foundry, such as IC fab 740 of FIG. 7, and/or semiconductor technology node for fabricating the IC. The clustering verification application 108 determines whether an error(s) exists within the one or more characteristics, parameters, or attributes of the electronic architectural design for the analog circuitry and/or the digital circuitry of the IC.

In some embodiments, an EDA system, such as EDA system 100 in FIG. 1, is configured to reduce runtime of antenna verification through clustering. In some embodiments, a verification application is configured to reduce runtime of antenna verification through rule or operational clustering. In some embodiments, a method for reducing computational runtime of physical verification through one of design rule clustering or operations clustering is discussed. Runtime, run time, or execution time is the running phase of a program, in which the code is being executed on the computer's central processing unit (CPU) as machine code. As discussed in more detail below, the clustering verification application 108 groups together or clusters rules and/or operations to perform verification of the electronic architectural design for the antenna in parallel via the processors 602, 603, 604. The clustering verification application 108 submits unique rules and/or operations to the processors 602, 603, 604 to eliminate redundant rules and/or operations from being performed by the processors 602, 603, 604, thereby speeding processing of the rules and/or operations.

In some embodiments, a runtime reduction method substantially speeds up the physical verification process through rule and/or operation clustering. The substantially reduced runtime supports faster physical verification and faster tape out (TO). TO is used to describe the creation of the photomask, such as mask 736 in FIG. 7, from the final approved electronic CAD file. Designers use this term to refer to the writing of the final file to disk or CD and its subsequent transmission to the semiconductor foundry. However, in current practice the foundry performs checks and makes modifications to the mask design specific to the manufacturing process before actual TO. An IC goes through a design process before being ready for TO. Many of the steps along the way use software tools collectively known as EDA tools. The design, such as IC design layout diagram 722 of FIG. 7, then goes through a series of verification steps before being taped-out.

EDA tools of other approaches do not provide an efficient way to scale (reduce) the physical verification runtime, especially the antenna verification. While other approaches have adopted multiple machines (e.g., computers/processors) and multiple machines operating in parallel (where a computational task is typically broken down into several, often many, very similar sub-tasks that are processed independently and whose results are combined afterwards, upon completion), but the runtime improvement is limited.

Other approaches have used one computer or one processor to perform the large amount of verification processes, which resulted in runtimes lasting in excess of ten hours, especially complicated design. Other approaches have attempted to reduce runtime through enhancing hardware. That is, adding more computers or more processing units to reduce runtime. However, antenna verification showed limited runtime gain when using additional computers or processors (e.g., approximately one hour depending on the IC). Other approaches that have used multiple computers or processors to process partial rules in parallel have realized a better runtime gain, in comparison to other approaches, but in comparison to the total runtime, the savings was still small, because of the significant repeating operations in parallel run.

Figure 2:
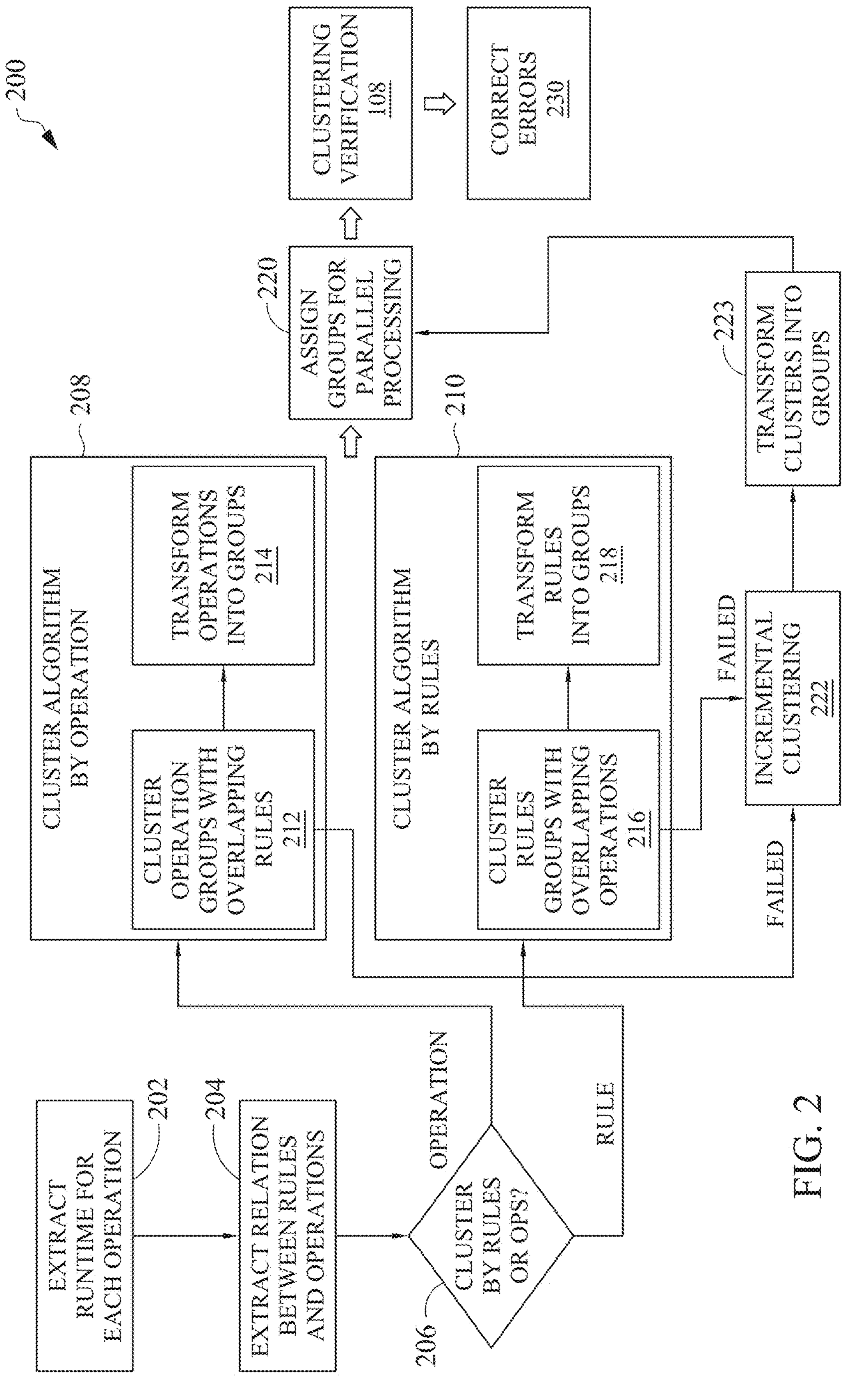
FIG. 2 is a flow diagram of a verification runtime reduction method, in accordance with some embodiments.

FIG. 2 is a flow diagram of a verification runtime reduction method 200, in accordance with some embodiments.

In some embodiments, verification runtime reduction method 200 describes process tasks of creating clusters (e.g., rule or operations clusters) for parallel processing on more than one computer or processor. While the operations of verification runtime reduction method 200 are discussed and shown as having a particular order, each operation in verification runtime reduction method 200 is configured to be performed in any order unless specifically called out otherwise. Verification runtime reduction method 200 is implemented as a set of operations, such as operations 202 through 218. Further, verification runtime reduction method 200 is discussed with reference to FIGS. 3A-5 to assist in an understanding of verification runtime reduction method 200. The rule is composed of the operations, and each operation is the basic element of decks. Designers can select the rules of the deck to process partial rules. The method 200 proposes multiple parallel runs. The complete rules are divided into the parallel runs. The cluster process can enable the parallel runs with limited repeating operations. When extracting the independent operation clusters by algorithm by operation, user can transform it into the independent rule clusters and make the parallel runs accordingly, since we have the relation between rules and operations 204.

At operation 202 of verification runtime reduction method 200, a runtime for each verification operation for the electronic architectural design is extracted. The runtime of a verification operation is the period during which the verification operation is executed in a computer program. In some embodiments, operations are the set of all processes provisioned by a design rule check (DRC) and/or an antenna check. In some embodiments, an operation implements a single rule check. In some embodiments, an operation is included by multiple rules. In some embodiments, single rule check is composed of more than one operation.

In EDA, a design rule is a geometric constraint imposed on a circuit board, a semiconductor device, and/or an IC designer to ensure the design functions properly, reliably, and are produced with acceptable yield. Design rules for production are developed by process engineers based on the capability of processes to realize design intent. EDA is used extensively to ensure that designers do not violate design rules through a process called design rule checking (DRC). DRC is a step during physical verification signoff on the design, which also involves LVS (layout versus schematic) checks, XOR checks, ERC (electrical rule check), and antenna checks. Design rules and DRC are used extensively for ICs, which have micro- or nano-scale geometries.

Design rules are a series of parameters provided by semiconductor manufacturers that enable a designer to verify the correctness of a mask set. Design rules are specific to a particular semiconductor manufacturing process. A design rule set specifies certain geometric and connectivity restrictions to ensure sufficient margins to account for variability in semiconductor manufacturing processes, to ensure that most of the parts work correctly. Some basic design rules include single layer rules (the lowest layers having the smallest rules (e.g., X nm) and the highest metal layers having larger rules (e.g., 4X nm)), a width rule specifies the minimum width of any shape in the design, and a spacing rule specifies the minimum distance between two adjacent objects. A two-layer rule specifies a relationship that must exist between two layers. For example, an enclosure rule might specify that an object of one type, such as a contact or via, must be covered, with some additional margin, by a metal layer. A minimum area rule is a rule to minimize an area. Antenna rules are complex rules that check ratios of areas of every layer of a net for configurations that can result in problems when intermediate layers are etched.

DRC has evolved from simple measurement and Boolean checks to more involved rules that modify existing features, insert new features, and check the entire design for process limitations such as layer density. DRC software usually takes as input a layout in the GDSII standard format and a list of rules specific to the semiconductor process chosen for fabrication.

DRC is a computationally intense task. If run on a single CPU, a design rule check potentially takes up to a week to complete for modern designs. Most design companies require DRC to run in less than a day to achieve reasonable cycle times since the DRC likely is run several times prior to design completion (e.g., up to 20 times).

In some embodiments, a runtime for each verification operation is extracted from prior runtimes performed on similar ICs (that include substantially similar cells from a cell library) and stored in a master database. In some embodiments, a runtime for each verification operation is extracted through a software estimation based on the size and complexity of the IC and prior operation runtimes of ICs with similar size and complexity. In some embodiments, a runtime for each verification operation is extracted after running a handful of operations and estimating the runtime for the remaining operations based on the runtime of the handful of operations. In response to extracting the runtime for each verification operation, the process flows from operation 202 to operation 204.

At operation 204 of verification runtime reduction method 200, a relation between rules and operations is extracted. With reference to Table 1 below, the relation between rules and operations is shown. As performed in operation 202, the runtime is shown in column 1 for each operation. In some embodiments, runtime is represented in milliseconds, microseconds, or seconds. Op1 or operation 1 is shown as performing rule check 1 and rule check 2. Op2 or operation 2 is shown as performing rule check 2. Op3 or operation 3 is shown as performing rule check 3. Table 1 is used for discussion purposes to simplify the discussion of relating the operations to the rules as in a typical verification process there are as many as thousands of operations and as many as or more than a thousand rules.

TABLE 1

| RELATION | | |
|---|---|---|
| RUNTIME | OPERATION NAME | RULE NAME |
| 206 | op1 | rule1, rule2 |
| 300 | op2 | rule2 |
| 290 | op3 | rule3 |

In response to the extraction of the relationship between the rules and the operations, the process flows from operation 204 to operation 206.

At operation 206 of verification runtime reduction method 200, a determination is made as to whether to cluster based upon the rules or based upon the operations. In some embodiments, this selection is made by one or more IC designers. In some embodiments, this is a selection made within the EDA software prior to verification. In some embodiments, the EDA software selects whether to cluster by rules or by operations.

In response to a determination to cluster by rules or operations, process flows from operation 206 to either operation 208 if clustering by operations or operation 210 if clustering by rules. Operation 208 implements an algorithm for clustering by operations and operation 210 implements an algorithm for clustering by rules. Although operation 206 is shown as flowing to either operation 208 or operation 210, in some embodiments such is performed for a portion of the electronic architectural design, with portions of the electronic architectural design flowing to operation 208 and another portion of the electronic architectural design flowing to operation 210. Thus, for a single electronic architectural design both operation 208 and operation 210 are implemented for different portions. For an understanding of operations 208 and 210, FIGS. 3A and 3B, discussed below, provide an example of clustering by operation and clustering by rule, respectively.

Figure 3A:
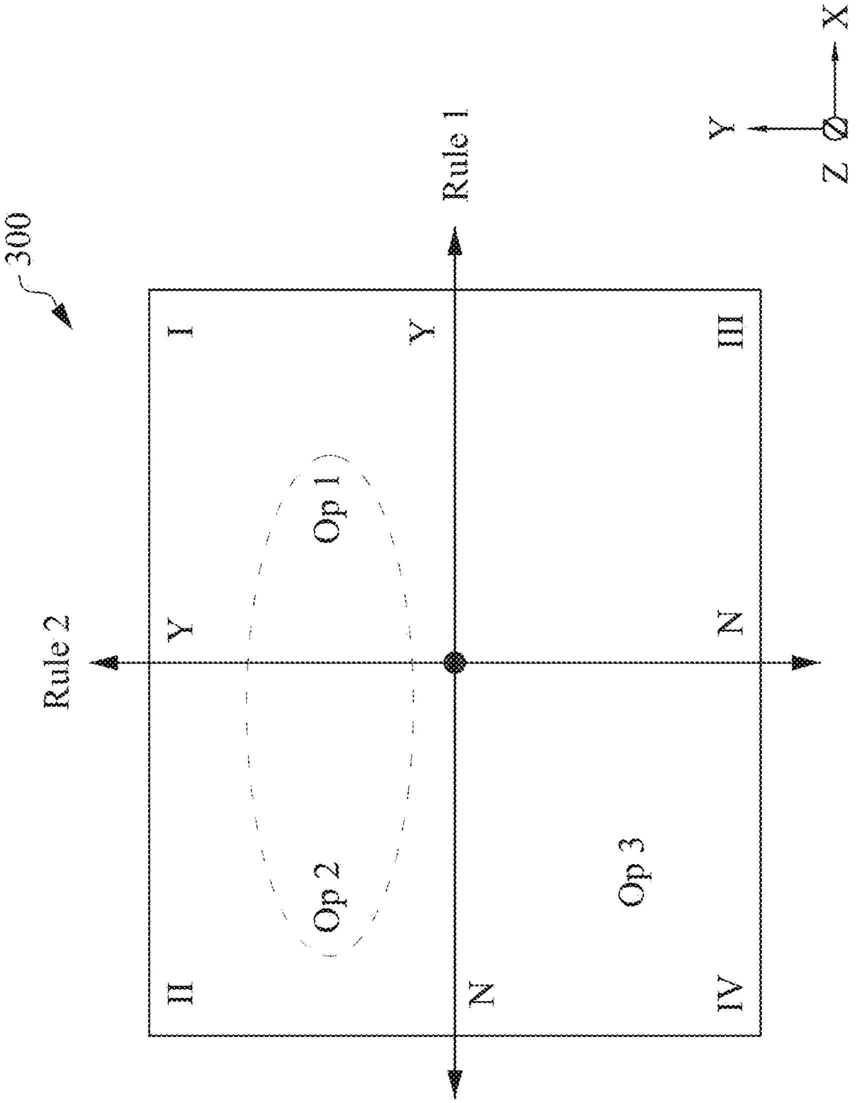
FIG. 3A is a graph representation of rule-based clustering, in accordance with some embodiments.

FIG. 3A is a rule-based clustering graph representation 300 of Table 1, in accordance with some embodiments.

At operation 208 of verification runtime reduction method 200, a cluster algorithm (discussed below) clusters operations based upon commonality of rule meaning that operations share at least one same or common rule are clustered. In FIG. 3A, rule 1 is along the X-axis and rule 2 is along the Y-axis. Space to the right of the Y-axis is considered positive in the X-axis and space to the above of the X-axis is considered positive. Quadrant I represents space where both rule 1 and rule 2 are positive. Quadrant II represents space where rule 2 is positive and rule 1 is negative. Quadrant III represents space where rule 1 is positive and rule 2 is negative. Quadrant IV represents space where rule 1 and rule 2 are negative. The process flows from operation 208 to operation 212.

At operation 212 of verification runtime reduction method 200, operation groups with one or more same rules are clustered together meaning that operations share at least one same or common rules are clustered. In other word, for the same cluster, one operation at least share one rule with another operation. In FIG. 3A, operation 1 is in quadrant I as operation 1 is part of rule1 and rule2. Operation 2 is in quadrant II as rule 2 is the only rule associated with operation 2. Operation 3 is in quadrant IV as rule 1 and rule 2 don't include operation 3. Thus, operation 1 and operation 2 are positively located on graph representation 300 and thus grouped together as operation 1 and operation 2 have a common rule, namely rule 2. In some embodiments, if operation 3 was in quadrant III, then operation 1, operation 2, and operation 3 are positively located and operation 1, 2, and 3 are grouped together as they would have overlapping rules 1 and 2. Rule-based clustering graph representation 300 is a simplification of the cluster algorithm but is used for discussion of verification runtime reduction method 200 in reaching a better understanding of the cluster algorithm. Process flows from operation 212 to operation 214.

At operation 214 of verification runtime reduction method 200, the clustered operations from operation 212 are transformed into groups based upon the results of operation 212. In a non-limiting example, operations 1 and 2 are renamed as group 1 and operation 3 is renamed as group 2.

Figure 3B:
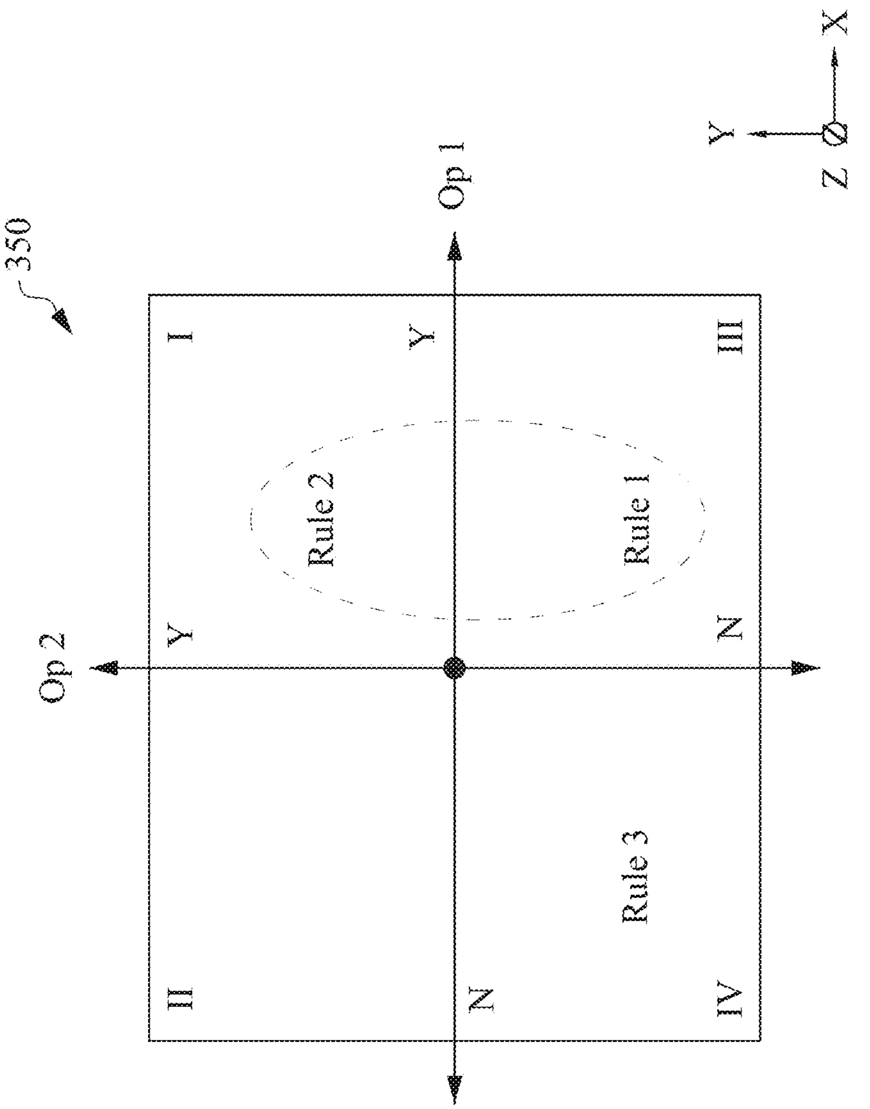
FIG. 3B is a graph representation of operation-based clustering, in accordance with some embodiments.

FIG. 3B is an operation-based clustering graph representation 350 of Table 1, in accordance with some embodiments.

At operation 210 of verification runtime reduction method 200, the cluster algorithm (discussed below) clusters rules based upon commonality of operation meaning that rules share at least one same or common operation are clustered. In FIG. 3B operation 1 is shown along the X-axis and operation 2 is shown represented along the Y-axis. Space to the right of the Y-axis is considered positive in the X-axis and space to the above the X-axis is considered positive. Quadrant I represents space where both operation 1 and operation 2 are positive. Quadrant II represents space where operation 2 is positive and operation 1 is negative. Quadrant III represents space where operation 1 is positive and operation 2 is negative. Quadrant IV represents space where operation 1 and operation 2 are negative. The process flows from operation 210 to operation 216.

At operation 216 of verification runtime reduction method 200, rule groups with one or more same operations are clustered together. In FIG. 3B, rule 2 is in quadrant I as rule 2 include both operation 1 and operation 2. Rule 1 is in quadrant III as rule 1 is the only rule associated with operation 1. Operation 3 is in quadrant IV as operation 3 is not associated with operation 1 nor operation 2. Thus, rule 1 and rule 2 are positively located on graph representation 350 and thus grouped together as rule 1 and rule 2 has an overlapping operation (repeating operation), namely operations 1. In some embodiments, if rule 3 was in quadrant II (as part of operation 2), then rule 1, rule 2, and rule 3 are positively located and rules 1, 2, and 3 are grouped together as they would have overlapping operations 1 and 2. Operation-based clustering graph representation 350 is a simplification of the cluster algorithm, but is used for discussion of verification runtime reduction method 200 in reaching a better understanding of the cluster algorithm. The process flows from operation 216 to operation 218.

At operation 218 of verification runtime reduction method 200, the clustered rules from operation 216 are transformed into groups based upon the results of operation 216. In a non-limiting example, rules 1 and 2 are renamed as group 1 and rule 3 is renamed as group 2.

FIG. 4 is a diagram showing the assignment 400 of groups for parallel processing by the processors 602, 603, 604, in accordance with some embodiments. Although rules are clustered or grouped within the example shown, the principles disclosed equally apply to grouping of operations for parallel processing by the processors 602, 603, 604. In the non-limiting example shown, cluster result 401 includes group 1, group 1 including rules 1, 2 at runtime A; group 2 includes rule 3 at runtime B; group 3 includes rules 4, 5, 6 at runtime C; group 4 includes rules 7, 8, 9 at runtime D; group 5 includes rules 10, 11, 12, 14 at runtime E; group 6 includes rules 15, 16 at runtime F; and group 7 includes 17, 18, and 19 at runtime G, with runtimes A-G totaling a total runtime of T.

At operation 220 of verification runtime reduction method 200, the groups of rules produced by the operations 214, 218 are assigned for parallel processing, such as by the clustering verification application 108. The prevailing EDA tools process deck by selecting the needed rules, instead of selecting operations. The groups 1-7 are then assigned, with parallel proposal 402 of operation 220, to available "machines," in this example processors 602, 603, 604, for verification. In this example, "run1" or a first run is a process by which groups 1, 2, 3 are verified by a first processor, such as processor 902. In parallel with groups 1, 2, 3 being verified by processor 902, groups 4, 5 are verified during "run2" or a second run by a second processor, such as processor 903. Likewise, in parallel with groups 1, 2, 3 and 4, 5 being verified by processors 902, 903, correspondingly, groups 6, 7 are verified during a "run3" or third run by a third processor, such as processor 904. The number of parallel runs is less than or equal to the number of processors. To optimize parallelization, the number of parallel runs is equal to the number of processors, in this example, the number of parallel runs is three and the number of processors is three, illustrating an optimal assignment of runs to processors. Also, the number of parallel runs is less than or equal to the number of groups. Although only three processors for three parallel runs are shown for simplicity of explanation, the higher the parallel run number, the lower the overall time for verification. Thus, as not only the first, second, and third runs are verified in parallel by the processors 602, 603, 604, but since the processors 602, 603, 604 each perform verification for unique rules that do not overlap any operations, processing efficiency is increased supporting faster TO. In other word, the less overlapping operations among parallel runs can exhibit faster verification time.

In circuit design, an antenna is a metal interconnect, i.e., a conductor like polysilicon or metal, that is not electrically connected to silicon or grounded, during the processing steps of the IC circuit. During the manufacturing process, charge accumulation occurs on the antenna during certain fabrication steps like plasma etching, which uses highly ionized matter to etch. If the antenna includes no connection to silicon or ground, charges build up on the antenna to the point where rapid discharge occurs and permanent physical damage results to thin transistor gate oxide. This rapid and destructive phenomenon is known as the antenna effect and antenna verification can detect unacceptable antenna error (violation). The verification runtime reduction method 200 is followed by a correct errors application 230. In the case of an antenna error, the correct errors application 230 cures the antenna error by modifying the electronic architectural design to mitigate the error, in at least one embodiment, by adding a small antenna diode to the antenna to safely discharge the node. In at least one alternate embodiment, the correct errors application 230 cures the antenna errors by splitting the antenna to routing the antenna up to a second metal layer of the electronic architectural design and then down to a first metal layer. The EDA system 100 then provides the modified electronic architectural design to the IC manufacturing system 700 to manufacture an IC using the modified electronic architectural design.

The antenna verification is commonly part of the physical verification process. While portions of embodiments or some embodiments are discussed in relation to antenna verification and other portions of embodiments or some embodiments are discussed in relation to physical verification, it is understood that antenna verification is a verification subset of physical verification and the overall runtime reduction, in some embodiments, occurs not only for the antenna verification but also for the overall physical verification.

Figure 5:
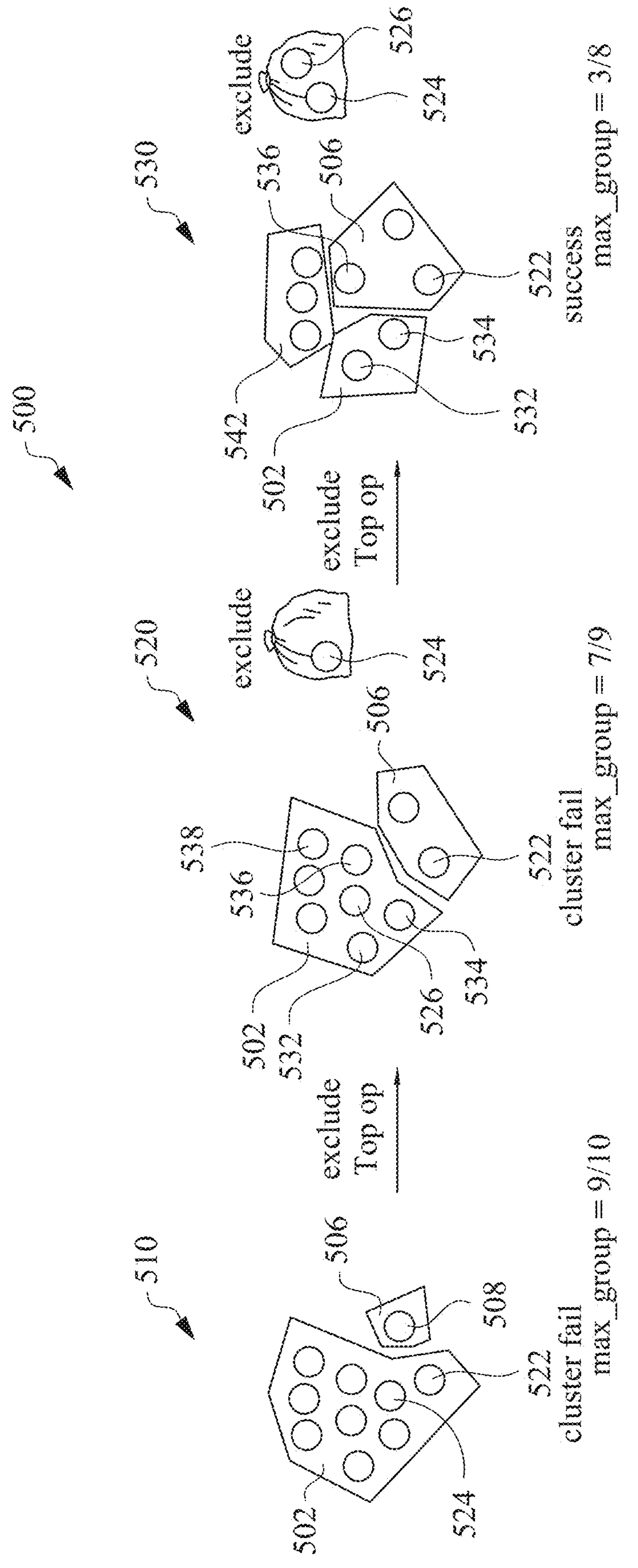
FIG. 5 is a diagram of incremental clustering steps, in accordance with some embodiments.

FIG. 5 is a diagram of incremental clustering steps 500, such as performed by the clustering verification application 108, in accordance with some embodiments.

Incremental clustering application 222, of verification runtime reduction method 200, performs incremental clustering to deal with rules and/or operations that failed to be clustered, such as in instances where the operations 212, 216 fail to cluster rules and/or operations. FIG. 5 is an example of incremental clustering steps performed by the incremental clustering application 222. The incremental clustering steps 500 implement a first iteration 510 in which a large number of operations are clustered within a first cluster 502. In this example, the first cluster 502 includes nine operations. And these nine operations are clustered together, because each operation has at least one similar rule to another operation in cluster 502. Thus, these operations are clustered because they have commonality in rule space, as the idea in FIG. 3A. This rule space consists of multiple rules. The cluster came from the commonality in rule space, instead of the relatively position in FIG. 5. A second cluster 506 includes a single operation 508, because operation 508 doesn't have share any rule with other operations. The relative positions of the operations within the first cluster 502 and the second cluster 506 signify same operations between the first iteration 510, a second iteration 520, and a third iteration 530. Should first cluster 502 be submitted to a first processor for verification and the second cluster 506 be submitted to a second processor for processing, the first processor would be overburdened and the second processor would be underburdened, although the two runs don't process repeating operations. Thus, incremental clustering is performed on the first iteration 510 to more evenly distribute the operations between clusters.

To more evenly distribute operations within clusters, a Max_group_threshold or maximum threshold is defined. Any biggest cluster from available clusters should be less than the Max_group_threshold. In response to the biggest cluster from available clusters being greater than the Max_group_threshold, the clustering is considered to have failed which triggers another iteration which performs further incremental clustering on the clusters to more evenly distribute the operations. In some embodiments, the Max_group_threshold is 0.5. In some embodiments, the Max_group_threshold means the ratio of operation number of the cluster to the total operation numbers. In some embodiment. the Max_group_threshold means the ratio of runtime of the cluster to the total runtime.

With the largest cluster of the first iteration 510 having ten total operations between the first cluster 502 and the second cluster 506, the maximum size of any one cluster should be less than 0.5 of the total number of operations in the first cluster 502 and the second cluster 506, which is in this example 9/10 that is greater than the Max_group_threshold of 0.5 indicating that the clustering of the first iteration 510 has failed.

Incrementally clustering the first iteration 510 results in implementing the second iteration 520. The second iteration 520 excludes one operation, operation 524, from the following clustering process. In some embodiments, the proposed operation 524 can be the lowest time-consuming operation, and this proposal make the repeating operation 524 in parallel run with less run time impact of the parallel process. In some embodiments, the proposed operation 524 is the "top op" operation with maximum commonality from cluster 502 in 510 iteration. In some embodiments, the related rule list of operation can be an index of commonality. That means, after excluding operation 524, the cluster 502 can easily break into smaller clusters. In other words, if run1 (including all 502 feature) and run2 (including all 506 features) process parallelly, only operation 524 will be processed in run1 and run2.

With the largest cluster of the second iteration 520 having nine total operations (after an operation is excluded) between the first cluster 502 and the second cluster 506, the maximum size of any one cluster should be less than 0.5 of the total number of operations in the first cluster 502 and the second cluster 506, which is now in this example 7/9 that is still greater than the Max_group_threshold of 0.5 indicating that the clustering of the second iteration 520 has failed.

Incrementally clustering the second iteration 520 results in implementing the third iteration 530. The third iteration 530 excludes another operation from the second iteration 520. In particular, operation 526 shown in the second iteration 520 as residing in first cluster 502 is excluded in the third iteration 530. Operation 526, similar to operation 524, is a "top op" or an operation from the second cluster 502 shown in the second iteration 520 that has a longest rule list as potential to have the highest commonality with all of the operations surrounding the operation 526. After excluding operation 526, the cluster process again, and make cluster 506, 502, and 542.

The third iteration 530 has eight total operations (after operation 526 is excluded) between the first cluster 502, the second cluster 506, and the third cluster 542. The maximum size of any one cluster should be less than 0.5 of the total number of operations in the first cluster 502, the second cluster 506, and the third cluster 542, which is now in this example 3/8 that is now less than the Max_group_threshold of 0.5 indicating that the clustering of the third iteration 530 is a success to more evenly distribute the clusters between the processors 602, 603, 604. Thus, the Max_group_threshold of 0.5 is but one non-limiting example of a threshold to more evenly distribute the clusters between the processors 602, 603, 604, thereby speeding verification, with other Max_group_thresholds possible to speed verification. Larger and smaller thresholds are possible that evenly distribute the clusters between the processors 602, 603, 604.

With the first cluster 502, the second cluster 506, and the third cluster 542 including more evenly distributed operations, the first cluster 502, the second cluster 506, and the third cluster 542 are assigned for parallel processing. At operation 220 of verification runtime reduction method 200, the first cluster 502, the second cluster 506, and the third cluster 542 produced by the incremental clustering operation 222 are assigned for parallel processing. Based on the relation between rules and operations, we can transform the operation cluster 502 into rule cluster 502. According to the same methodology, we can have rule cluster 506 and rule cluster 542. Then, the first rule cluster 502 is assigned to processor 902, the second rule cluster 506 is assigned to processor 903, and the remaining rules is assigned to the processor 904, for parallel processing. Although the operations 524, 526 are described above as being excluded, remaining rules to processor 904 can make sure overall rule coverage. In some embodiments, operation 524 is assigned to processor 602 and operation 526 is assigned to processor 604 for parallel processing of excluded operations 524, 526. Once clustering of the operations has been completed by the incremental clustering operation 222, at operation 223 the first cluster 502, the second cluster 506, and the third cluster 542 are transformed into groups. In this example, the first cluster 502 is assigned to group 1, the second cluster 506 is assigned to group 2, and the third cluster 542 is assigned to group 3. The process flows from operation 223 to operation 220 discussed above for assigning groups for parallel processing. Groups 1-3 are correspondingly assigned to the processors 602, 603, 604 for parallel processing.

The aforementioned operations for antenna check are provided as examples. In some embodiments, operations for antenna check are adapted to operations for the design rule check (DRC) as well. The rule cluster with limited repeating operation benefits the runtime by processing the rule cluster in parallel. The faster verification came from the parallel process rules with limited repeating operation. In some embodiments, designer uses k-means, hierarchical clustering, DBSCAN, or other algorithms to generate the clusters with limited repeating operation. In some embodiments, the multiple runs are adapted to verify the rule clusters as well.

Figure 6:
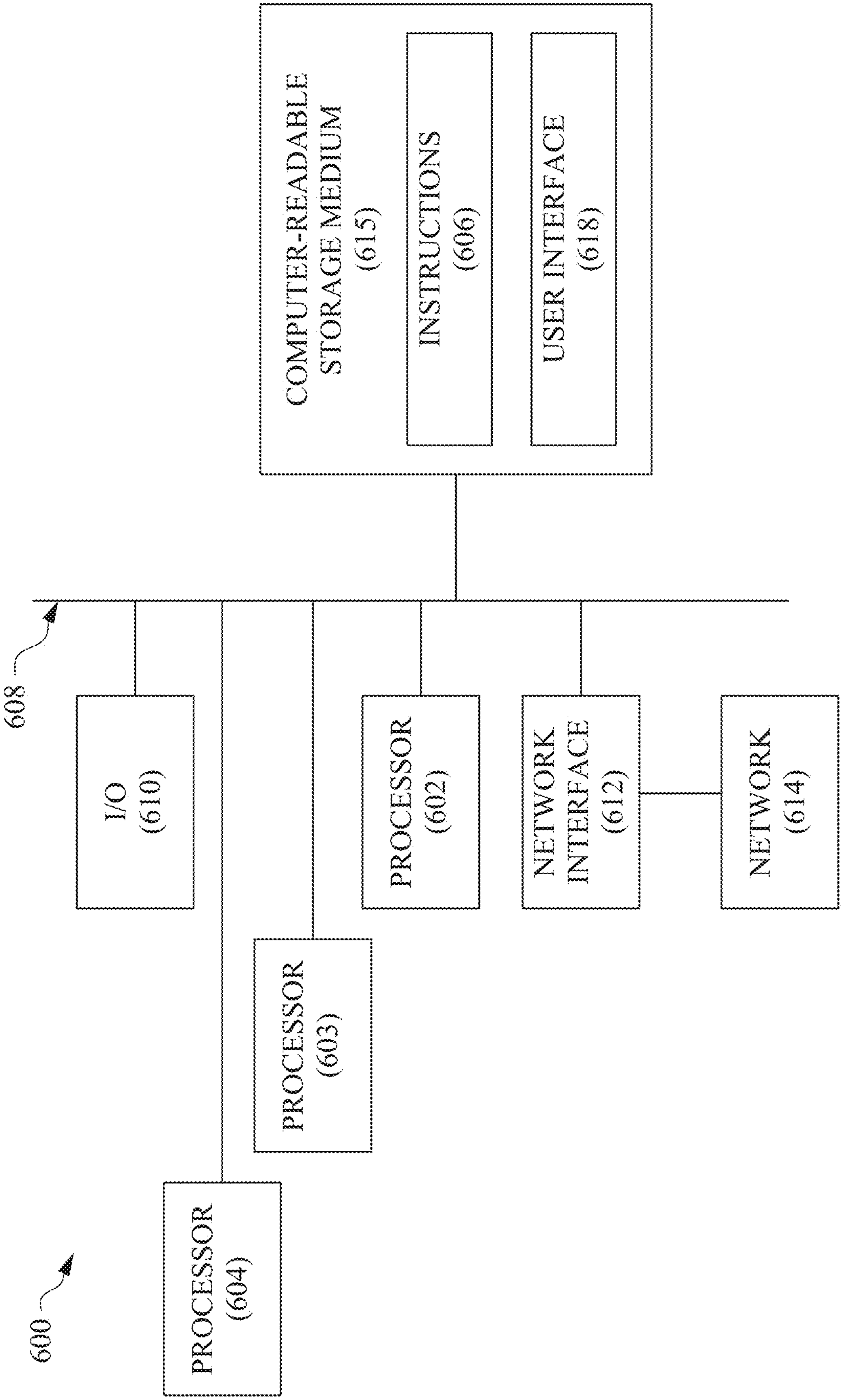
FIG. 6 is a block diagram of processing circuitry usable for implementing one or more of the features of the EDA system shown in FIG. 1, in accordance with some embodiments.

FIG. 6 is a block diagram of processing circuitry 600 to implement any of the features of the EDA system 100, in accordance with some embodiments. In some embodiments, processing circuitry 600 is a general-purpose computing device including a hardware processor 602, 603, 604 and a non-transitory, computer-readable storage medium 615. Storage medium 615, amongst other things, is encoded with, i.e., stores, instructions or computer program code 606, i.e., a set of executable instructions such as an algorithm, and any of the other processes described above performed by the EDA system 100. Execution of instructions or computer program code 606 by the hardware processors 602, 603, 604 represents (at least in part) the clustering verification application 108 which implements a portion, or all the methods described herein in accordance with one or more embodiments (hereinafter, the noted processes and/or methods).

Processors 602, 603, 604 are electrically coupled to a computer-readable storage medium 615 via a bus 608. Processors 602, 603, 604 are further electrically coupled to an I/O interface 610 by bus 608. A network interface 612 is further electrically connected to processors 602, 603, 604 via bus 608. Network interface 612 is connected to a network 614, so that processors 602, 603, 604 and computer-readable storage medium 615 connect to external elements via network 614. Processors 602, 603, 604 are configured to execute computer program code 606 encoded in computer-readable storage medium 615 to cause processing circuitry 600 to be usable for performing a portion or all the noted processes and/or methods. In one or more embodiments, processors 602, 603, 604 are a central processing unit (CPU), a distributed processing system, an application specific integrated circuit (ASIC), and/or a suitable processing unit. In accordance with the clustering verification application 108 described above, the processors 602, 603, 604 perform parallel processing to execute rule groups/clusters formulated by the clustering verification application 108 in parallel to speed processing of the rule groups/clusters.

In one or more embodiments, computer-readable storage medium 615 is an electronic, magnetic, optical, electromagnetic, infrared, and/or a semiconductor system (or apparatus or device). For example, computer-readable storage medium 615 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, computer-readable storage medium 615 includes a compact disk-read only memory (CD-ROM), a compact disk-read/write (CD-R/W), and/or a digital video disc (DVD).

In one or more embodiments, storage medium 615 stores computer program code 606 configured to cause processing circuitry 600 to be usable for performing a portion or all the noted processes and/or methods. In one or more embodiments, storage medium 615 further stores information, such as an algorithm which facilitates performing a portion or all the noted processes and/or methods.

Processing circuitry 600 includes I/O interface 610. I/O interface 610 is coupled to external circuitry. In one or more embodiments, I/O interface 610 includes a keyboard, keypad, mouse, trackball, trackpad, touchscreen, and/or cursor direction keys for communicating information and commands to processor 602.

Processing circuitry 600 further includes network interface 612 coupled to processor 602. Network interface 612 allows Processing circuitry 600 to communicate with network 614, to which one or more other computer systems are connected. Network interface 612 includes wireless network interfaces such as BLUETOOTH, WIFI, WIMAX, GPRS, or WCDMA; or wired network interfaces such as ETHERNET, USB, or IEEE-864. In one or more embodiments, a portion or all noted processes and/or methods, is implemented in two or more Processing circuitry 600.

Processing circuitry 600 is configured to receive information through I/O interface 610. The information received through I/O interface 610 includes one or more of instructions, data, design rules, and/or other parameters for processing by processor 602. The information is transferred to processor 602 via bus 608. Processing circuitry 600 is configured to receive information related to the UI 618 through I/O interface 610. The information is stored in computer-readable storage medium 615 as UI 618.

In some embodiments, a portion or all the noted processes and/or methods is implemented as a standalone software application for execution by a processor. In some embodiments, a portion or all the noted processes and/or methods is implemented as a software application that is a part of an additional software application. In some embodiments, a portion or all the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In one or more embodiments, Storage Medium 615 stores instructions configured to cause processor 602 to perform at least a portion of the processes and/or methods for verifying rule groups/clusters, such as those performed by clustering verification application 108.

Figure 7:
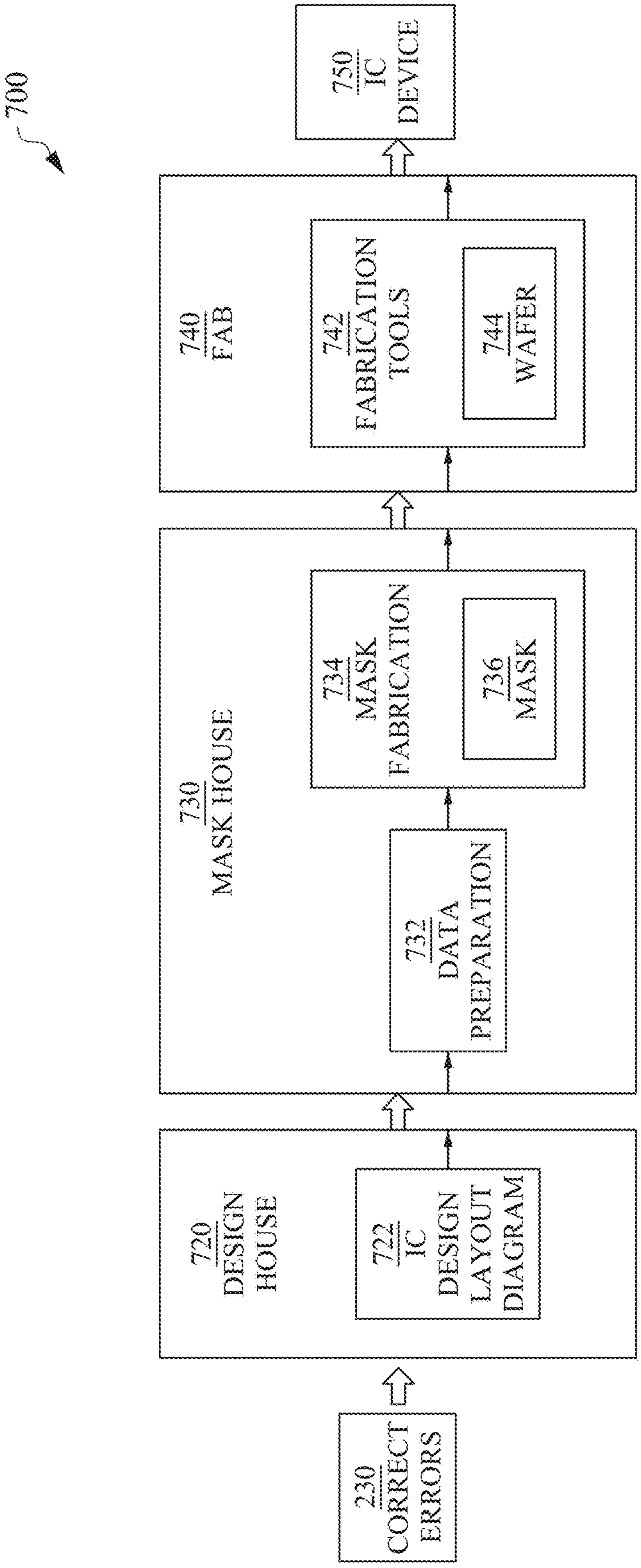
FIG. 7 is a block diagram of an integrated circuit (IC) manufacturing system, and an IC manufacturing flow associated therewith, in accordance with some embodiments.

FIG. 7 is a block diagram of an integrated circuit (IC) manufacturing system 700, and an IC manufacturing flow associated therewith, in accordance with some embodiments. After correct errors application 230 of FIG. 2, using the modified electronic architectural design, at least one of (A) one or more semiconductor masks or (B) at least one component in a layer of an inchoate semiconductor integrated circuit is fabricated using IC manufacturing system 700.

In FIG. 7, IC manufacturing system 700 includes entities, such as a design house 720, a mask house 730, and an IC manufacturer/fabricator ("fab") 740, that interact with one another in the design, development, and manufacturing cycles and/or services related to manufacturing an IC device 750. In accordance with the example discussed above, the IC device 750 includes at least one antenna. The entities in IC manufacturing system 700 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and supplies services to and/or receives services from one or more of the other entities. In some embodiments, two or more of design house 720, mask house 730, and IC fab 740 is owned by a single larger company. In some embodiments, two or more of design house 720, mask house 730, and IC fab 740 coexist in a common facility and use common resources.

Design house (or design team) 720 receives the modified electronic architectural design that mitigates error from the correct errors application 230. The design house 720 generates an IC design layout diagram 722. IC design layout diagram 722 includes various geometrical patterns designed for an IC device 750. The geometrical patterns correspond to patterns of metal, oxide, or semiconductor layers that make up the various components of IC device 750 to be fabricated. The various layers combine to form various IC features. For example, a portion of IC design layout diagram 722 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 720 implements a proper design procedure to form IC design layout diagram 722. The design procedure includes one or more of logic design, physical design or place and route. IC design layout diagram 722 is presented in one or more data files having information of the geometrical patterns. For example, IC design layout diagram 722 is expressed in a GDSII file format or DFII file format.

Mask house 730 includes mask data preparation 732 and mask fabrication 734. Mask house 730 uses IC design layout diagram 722 to manufacture one or more masks to be used for fabricating the various layers of IC device 750 according to IC design layout diagram 722. Mask house 730 performs mask data preparation 732, where IC design layout diagram 722 is translated into a representative data file ("RDF"). Mask data preparation 732 supplies the RDF to mask fabrication 734. Mask fabrication 734 includes a mask writer. A mask writer converts the RDF to an image on a substrate, such as a mask (reticle) or a semiconductor wafer. The design layout is manipulated by mask data preparation 732 to comply with characteristics of the mask writer and/or requirements of IC fab 740. In FIG. 7, mask data preparation 732, mask fabrication 734, and mask 736 are illustrated as separate elements. In some embodiments, mask data preparation 732 and mask fabrication 734 are collectively referred to as mask data preparation.

In some embodiments, mask data preparation 732 includes optical proximity correction (OPC) which uses lithography enhancement techniques to compensate for image errors, such as those that arise from diffraction, interference, other process effects or the like. OPC adjusts IC design layout diagram 722. In some embodiments, mask data preparation 732 includes further resolution enhancement techniques (RET), such as off-axis illumination, subresolution assist features, phase-shifting masks, other suitable techniques, or the like or combinations thereof. In some embodiments, inverse lithography technology (ILT) is further used, which treats OPC as an inverse imaging problem.

In some embodiments, mask data preparation 732 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, or the like. In some embodiments, the MRC modifies the IC design layout to compensate for limitations during mask fabrication 734, which may undo part of the modifications performed by OPC to meet mask creation rules.

In some embodiments, mask data preparation 732 includes lithography process checking (LPC) that simulates processing that is implemented by IC fab 740 to fabricate IC device 750. LPC simulates this processing based on IC design layout diagram 722 to fabricate a simulated manufactured device, such as IC device 750. The processing parameters in LPC simulation include parameters associated with various processes of the IC manufacturing cycle, parameters associated with tools used for manufacturing the IC, and/or other aspects of the manufacturing process. LPC considers various factors, such as aerial image contrast, depth of focus ("DOF"), mask error enhancement factor ("MEEF"), other suitable factors, or the like or combinations thereof. In some embodiments, after a simulated manufactured device has been fabricated by LPC, if the simulated device is not close enough in shape to satisfy design rules, OPC and/or MRC are be repeated to further refine IC design layout diagram 722.

The above description of mask data preparation 732 has been simplified for the purposes of clarity. In some embodiments, mask data preparation 732 includes additional features such as a logic operation (LOP) to modify the IC design layout according to manufacturing rules. Additionally, the processes applied to IC design layout diagram 722 during mask data preparation 732 may be executed in a variety of different orders.

After mask data preparation 732 and during mask fabrication 734, a mask 736 or a group of masks are fabricated based on the modified IC design layout. In some embodiments, an electron-beam (e-beam) or a mechanism of multiple e-beams is used to form a pattern on a mask (photomask or reticle) based on the modified IC design layout. The masks are formed in various technologies. In some embodiments, the mask is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region, and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask is an attenuated PSM or alternating PSM. The mask(s) generated by mask fabrication 734 is used in a variety of processes. For example, such a mask(s) is used in an ion implantation process to form various doped regions in the semiconductor wafer, in an etching process to form various etching regions in the semiconductor wafer, and/or in other suitable processes.

IC fab 740 is an IC fabrication business that includes one or more manufacturing facilities for the fabrication of a variety of different IC products. In some embodiments, IC fab 740 is a semiconductor foundry. For example, there may be a manufacturing facility for the front-end fabrication of a plurality of IC products (front-end-of-line (FEOL) fabrication), while a second manufacturing facility may supply the back-end fabrication for the interconnection and packaging of the IC products (back-end-of-line (BEOL) fabrication), and a third manufacturing facility may supply other services for the foundry business.

IC fab 740 uses mask 736 (or masks) fabricated by mask house 730 to fabricate IC device 750 using fabrication tools 742. Thus, IC fab 740 at least indirectly uses IC design layout diagram 722 to fabricate IC device 750. In some embodiments, a semiconductor wafer 744 is fabricated by IC fab 740 using the mask (or masks) to form IC device 750. Semiconductor wafer 744 includes a silicon substrate or other proper substrate having material layers formed thereon. Semiconductor wafer further includes one or more of various doped regions, dielectric features, multilevel interconnects, or the like (formed at subsequent manufacturing steps).

An aspect of this description relates to a method of performing a design rule check. The method includes clustering at least one of a plurality of rules with overlapping operations from a plurality of operations or the plurality of operations with overlapping rules from the plurality of rules into a clustered plurality of operations. The method further includes at least one of transforming at least one of the clustered plurality of operations into a first operation group or a second operation group, or transforming at least one of the clustered plurality of rules into a first rule group or a second rule group. The method even further includes at least one of assigning at least one of the first operation group to a first processor or the second operation group to a second processor, or assigning at least one of the first rule group to the first processor or the second rule group to the second processor. The method yet further includes parallel processing, via the first and second processors, at least one of the first operation group and the second operation group, or the first rule group and the second rule group, to determine whether an error exists within an electronic architectural design.

In another aspect of this description an electronic design automation (EDA) system includes a first processor, a second processor, a machine-readable medium. The machine-readable medium includes a clustering verification application, the clustering verification application configured to cluster at least one of a plurality of rules with overlapping operations from a plurality of operations or the plurality of operations with overlapping rules from the plurality of rules into a clustered plurality of operations. The clustering verification application is further configured to at least one of transform at least one of the clustered plurality of operations into a first operation group or a second operation group, or transform at least one the clustered plurality of rules into a first rule group or a second rule group. The clustering verification application is even further configured to at least one of assign at least one of the first operation group to a first processor or the second operation group to a second processor, or assign at least one of the first rule group to the first processor or the second rule group to the second processor. The clustering verification application is yet further configured to parallel process, via the first and second processors, at least one of the first operation group and the second operation group, or the first rule group and the second rule group, to determine whether an error exists within the electronic architectural design.

In yet another aspect of this description a non-transitory machine-readable medium having instructions stored thereon that, when executed by a computer, cause the computer to cluster at least one of a plurality of rules with overlapping operations from a plurality of operations or the plurality of operations with overlapping rules from the plurality of rules into a clustered plurality of operations. The instructions further cause the computer to at least one of transform at least one of the clustered plurality of operations into a first operation group or a second operation group, or transform at least one the clustered plurality of rules into a first rule group or a second rule group. The instructions even further cause the computer to at least one of assign at least one of the first operation group to a first processor or the second operation group to a second processor, or assign at least one of the first rule group to the first processor or the second rule group to the second processor, to parallel process, via the first and second processors, at least one of the first operation group and the second operation group, or the first rule group and the second rule group, to determine whether an error exists within the electronic architectural design.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of performing a design rule check, comprising:

clustering at least one of a plurality of rules with overlapping operations from a plurality of operations or the plurality of operations with overlapping rules from the plurality of rules into a clustered plurality of rules or a clustered plurality of operations;

performing a number of iterations in response to the clustering failing to produce at least one of the clustered plurality of operations or the clustered plurality of rules, the iterations comprising:

implementing a first iteration to form at least a first cluster of operations and a second cluster of operations; and excluding one operation in response to one of the clusters violating a threshold and performing the clustering again for remaining operations;

at least one of transforming at least one of the clustered plurality of operations into a first operation group or a second operation group, or transforming at least one of the clustered plurality of rules into a first rule group or a second rule group;

at least one of assigning at least one of the first operation group to a first processor or the second operation group to a second processor, or assigning at least one of the first rule group to the first processor or the second rule group to the second processor; and parallel processing, via the first and second processors, at least one of the first operation group and the second operation group, or the first rule group and the second rule group, to determine whether an error exists within an electronic architectural design.

2. The method according to claim 1, wherein the electronic architectural design includes an antenna, and an error mitigation that includes adding an antenna diode to the antenna to discharge a node of the antenna.

3. The method according to claim 1, wherein the electronic architectural design includes an antenna, and an error mitigation that includes splitting the antenna by routing the antenna to a second metal layer of the electronic architectural design and then to a first metal layer.

4. The method according to claim 1, further comprising implementing a third iteration and do the clustering after excluding an extra operation from the remaining operations of iteration.

5. The method according to claim 1, further comprising:

dividing a number of operations within a largest of the first and second clusters by a total number of operations within the first and second clusters; and triggering another iteration in response to a result of the dividing being greater than a maximum threshold.

6. The method according to claim 5, further comprising: stopping the iterations when none of the clusters violate the maximum threshold.

7. The method according to claim 6, wherein the maximum threshold is 0.5.

8. The method according to claim 1, further comprising:

modifying the electronic architectural design to mitigate the error within the electronic architectural design; and providing the modified electronic architectural design to an integrated circuit (IC) manufacturing system to manufacture an integrated circuit using the modified electronic architectural design.

9. An electronic design automation (EDA) system, comprising:

a first processor;

a second processor; and a machine-readable medium including a clustering verification application, the clustering verification application configured to:

cluster at least one of a plurality of rules with overlapping operations from a plurality of operations or the plurality of operations with overlapping rules from the plurality of rules into a clustered plurality of rules or a clustered plurality of operations;

perform a number of iterations in response to the clustering failing to produce at least one of the clustered plurality of operations or the clustered plurality of rules, to:

implement a first iteration to form at least a first cluster of operations and a second cluster of operations; and implement a second iteration to move a first operation from the first cluster to the second cluster and exclude a second operation from both the first cluster of operations and the second cluster of operations;

at least one of transform at least one of the clustered plurality of operations into a first operation group or a second operation group, or transform at least one of the clustered plurality of rules into a first rule group or a second rule group;

at least one of assign at least one of the first operation group to a first processor or the second operation group to a second processor, or assign at least one of the first rule group to the first processor or the second rule group to the second processor; and parallel process, via the first and second processors, at least one of the first operation group and the second operation group, or the first rule group and the second rule group, to determine whether an error exists within an electronic architectural design.

10. The EDA system according to claim 9, wherein the machine-readable medium further includes a correct errors application configured to modify the electronic architectural design to mitigate the error within the electronic architectural design.

11. The EDA system according to claim 10, wherein the EDA system provides the modified electronic architectural design to an integrated circuit (IC) manufacturing system to manufacture an integrated circuit using the modified electronic architectural design.

12. The EDA system according to claim 10, wherein the electronic architectural design includes an antenna, and an error mitigation including adding an antenna diode to the antenna to discharge a node of the antenna.

13. The EDA system according to claim 10, wherein the electronic architectural design includes an antenna, and an error mitigation including splitting the antenna by routing the antenna to a second metal layer of the electronic architectural design and then down to a first metal layer.

14. The EDA system according to claim 9, wherein the clustering verification application is further configured to:

define a maximum threshold;

divide a number of operations within a largest of the first and second clusters by a total number of operations within the first and second clusters; and trigger another iteration in response to a result of the divide being greater than the maximum threshold.

15. The EDA system according to claim 9, wherein the clustering verification application further performs the number of iterations to implement a third iteration and do the clustering after excluding an extra operation from the remaining operations of iteration.

16. A non-transitory machine-readable medium having instructions stored thereon that, when executed by a computer, cause the computer to:

cluster at least one of a plurality of rules with overlapping operations from a plurality of operations or the plurality of operations with overlapping rules from the plurality of rules into a clustered plurality of rules or a clustered plurality of operations;

implement a first iteration, in response to the clustering failing to produce at least one of the clustered plurality of operations or the clustered plurality of rules, to form at least a first cluster of operations and a second cluster of operations;

implement a second iteration to move a first operation from the first cluster of operations to the second cluster of operations and exclude a second operation from both of the first cluster of operations and the second cluster of operations;

at least one of transform at least one of the clustered plurality of operations into a first operation group or a second operation group, or transform at least one of the clustered plurality of rules into a first rule group or a second rule group; and at least one of assign at least one of the first operation group to a first processor or the second operation group to a second processor, or assign at least one of the first rule group to the first processor or the second rule group to the second processor, to parallel process, via the first and second processors, at least one of the first operation group and the second operation group, or the first rule group and the second rule group, to determine whether an error exists within an electronic architectural design.

17. The non-transitory machine-readable medium of claim 16 having instructions stored thereon that, when executed by the computer, further cause the computer to:

implement a third iteration and do the clustering after excluding an extra operation from the remaining operation of iteration.

18. The non-transitory machine-readable medium of claim 16 having instructions stored thereon that, when executed by the computer, further cause the computer to:

divide a number of operations within a largest of the first and second clusters by a total number of operations within the first and second clusters; and trigger another iteration in response to a result of the dividing being greater than a maximum threshold.

19. The non-transitory machine-readable medium of claim 18 having instructions stored thereon that, when executed by the computer, further cause the computer to:

stop the iterations when none of the clusters violates the maximum threshold.

20. The non-transitory machine-readable medium of claim 16, having instructions stored thereon that, when executed by the computer, further cause the computer to modify the electronic architectural design to mitigate the error within the electronic architectural design.

* * * * *